Reissued Nov. 25, 1952 Re. 23,588

UNITED STATES PATENT OFFICE 23,588

PRODUCTION OF FURFURYL UREA-FORMALDEHYDE THERMOSETTING RESINS

John Kenson Simons, Toledo, Ohio, assignor to Libbey-Owens-Ford Glass Company, Toledo, Ohio, a corporation of Ohio No Drawing. Original No. 2,595,492, dated May 6, 1952, Serial No. 43,341, August 9, 1948. Application for reissue October 4, 1952, Serial No. 313,199

22 Claims. (Cl. 260—173)

Matter enclosed in heavy brackets [ ] appears in the original patent but forms no part of this reissue specification; matter printed in italics indicates the additions made by reissue.

The invention relates to the production of novel thermosetting synthetic resins.

Many substances having a molecule which is an N-substituted urea or biuret molecule have been reacted with formaldehyde, and it has been found that such substances when reacted with formaldehyde almost invariably form thermoplastic rather than thermosetting resins. The principal object of the invention is the production of a thermosetting resin by reaction of an N-substituted urea or biuret with formaldehyde. More specific objects and advantages are apparent from the description, which discloses and illustrates but is not intended to limit the scope of the invention.

The present invention is based upon the discovery that a thermosetting resin may be obtained by the reaction of formaldehyde with N-substituted compounds having the following general formula

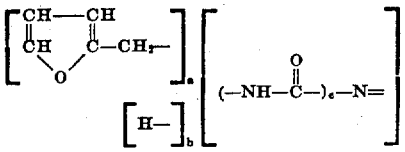

wherein each of the letters a, b and c represents an integer from 1 to 2, and a+b=3 and a+c=from 2 to 3.

The N-substituted compounds which may be used in the practice of the invention include furfuryl urea, having the following formula

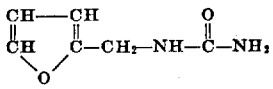

(wherein a=1, b=2, c=1, a+b=3, and a+c=2); symmetrical difurfuryl urea, having the following formula

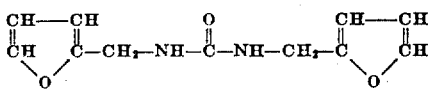

(wherein a=2, b=1, c=1, a+b=3, and a+c=3); unsymmetrical difurfuryl urea, having the following formula

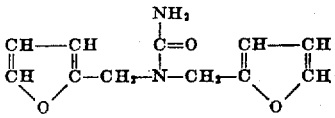

(wherein the values of the letters a, b and c are the same as those given above for symmetrical difurfuryl urea); and furfuryl biuret, having the following formula

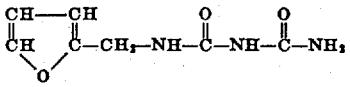

(wherein a=1, b=2, c=2, a+b=3, and a+c=3).

The N-substituted ureas may be prepared by carrying out a reaction which is represented theoretically in Equation 1 (below):

(1)

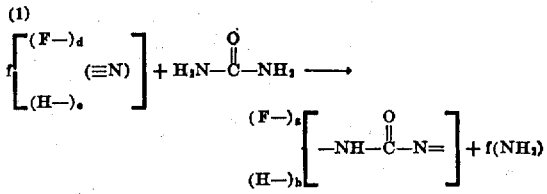

wherein F is a furfuryl radical, each of the letters d, e, f, g and h represents an integer from 1 to 2, and d+e=3, g+h=3, and f+d=from 2 to 3.

In accordance with Equation 1, furfuryl urea may be prepared by heating together furfuryl amine and urea in substantially equimolecular proportions at a temperature of about 100–150° C. Preferably, the reaction mixture consists of about one mol of furfuryl amine, about 1.1 mols of urea, and a small amount of water (e. g., about 10 per cent of the weight of the furfuryl amine); and the reaction is carried out under reflux conditions at about 115–135° C. For example, a mixture containing furfuryl amine, urea and a small amount of water is refluxed at about 130° C. until the liberation of ammonia from the reaction mixture ceases. The crude residue so obtained is crystallized twice from warm water to obtain a yield of substantially pure furfuryl urea.

Table 1 below shows the yields obtained by carrying out the foregoing procedure, and more specifically describes the procedure by which each yield is obtained by specifying the amount in grams of furfuryl amine used (line 2), the amount in grams of urea used (line 3), the amount in grams of water used (line 4), and the amount in grams of substantially pure furfuryl urea obtained (line 5).

Table 1

| 1. Run | 1A | 1B | 1C |
|---|---|---|---|
| | grams | grams | grams |
| 2. Furfuryl Amine | 97 | 194 | 453 |
| 3. Urea | 66 | 132 | 308 |
| 4. Water | 10 | 20 | 32 |
| 5. Furfuryl Urea (pure) | 101 | 210 | 452 |

From Table 1 it can be seen that yields as high as 75 per cent based on the furfuryl amine, may be obtained by carrying out the foregoing procedure (see Run 1B).

Symmetrical difurfuryl urea may be prepared by reacting furfuryl amine and urea in a one-step or a two-step reaction. In a one-step reaction, for example, a procedure is carried out which is the same as that described for the preparation of furfuryl urea except that the amount of furfuryl amine used is 97 grams, the amount of urea used is 60 grams, no water is used and a temperature of about 140° C. is maintained from the start of the reaction; and a yield of 15 grams of substantially pure symmetrical difurfuryl urea is obtained.

It is preferable to use a two-step reaction (i. e., first; reaction of furfuryl amine with urea to yield furfuryl urea; second; reaction of furfuryl amine with furfuryl urea to yield difurfuryl urea), because the yield obtained from the two-step reaction is substantially greater than that obtained from the one-step reaction. The reaction of furfuryl amine with furfuryl urea in the second step of the foregoing procedure may be carried out at about 100–150° C., but preferably at about 115–135° C. under reflux conditions. For example, a mixture of 22.3 grams of furfuryl amine and 32.5 grams of furfuryl urea is heated under reflux conditions at 140° C. until the liberation of ammonia ceases. The crude residue so obtained is crystallized twice from benzene and twice from methanol to obtain a yield of 19.9 grams of substantially pure symmetrical difurfuryl urea.

If difurfuryl amine is reacted with urea instead of furfuryl amine, by carrying out a procedure which is otherwise the same as that described for the preparation of furfuryl urea, the product obtained is unsymmetrical difurfuryl urea.

Furfuryl biuret may be prepared by heating an aqueous solution of furfuryl amine and nitro biuret in equimolecular proportions. When the foregoing solution is heated to about 80° C. excaping gases cause a noticeable effervescence (i. e., $N_2O$ which is a byproduct of the reaction). After the effervescence subsides, it is preferable to reflux the solution to complete the reaction before cooling the solution to allow the furfuryl biuret to precipitate. For example, a solution of 21 grams of furfuryl amine and 32.6 grams of nitro biuret in 200 cc. of water is heated slowly. At about 80° C. effervescence begins and, after the effervescence subsides, the solution is refluxed for 25 minutes and then cooled. The white crystalline precipitate which forms is filtered off and dried to obtain a yield of about 30 grams of substantially pure furfuryl biuret (which may be purified further by recrystallization from warm water).

In the practice of the invention the N-substituted compound may be reacted either with formaldehyde or with a polymer thereof, such as paraformaldehyde. When used for this reaction, the paraformaldehyde is considered to split up so that the substance actually taking part in the reaction with the N-substituted compound is formaldehyde. Preferably the N-substituted compound is reacted with a solution of formaldehyde in water, in an organic solvent such as alcohol, or in a liquid containing both water and an organic solvent. The most preferred solution is regular commercial Formalin, i. e., 37 per cent aqueous formaldehyde solution. (The terms "per cent" and "parts" as used herein to refer to quantities of material, mean per cent and parts by weight unless otherwise qualified.)

When a formaldehyde solution is used for the reaction with the N-substituted compound, the solution may have a pH ranging from about 4.0 to about 8.0, although the reaction is carried out preferably at a pH in the lower portion of the range, at least in the final stage of the reaction. It may be desirable to carry out the reaction using a substantially neutral pH at the start and subsequently lowering the pH to about 4.0. In such case, since commercial aqueous formaldehyde solution is strongly acid, a base is preferably added to bring the initial pH of the reaction solution to the desired value. The base employed may be an organic base such as triethanolamine, an inorganic base such as sodium carbonate or sodium hydroxide, or any other base.

In the practice of the invention, the ratio of the mols of formaldehyde to mols of the N-substituted compound used may range from about [1:1.5] *1.5:1* to about [1:4] *4:1*, the preferred ratio being about [1:2.5] *2.5:1*. The proportion of formaldehyde actually reacting with each mol of the N-substituted compound may range from about one to about two mols. If the reaction is carried out initially in a solution that is about neutral the reaction slows down appreciably after about one mol of formaldehyde has reacted with each mol of the N-substituted compound and it may be necessary to lower the pH of the solution to about 4.0 (e. g., by the addition of maleic or lactic acid) in order to react a second mol of formaldehyde with each mol of N-substituted compound. It is preferable to react from about 1.2 to about 1.9 mols of formaldehyde with each mol of N-substituted compound, and the optimum results are obtained if from about 1.4 to about 1.9 mols of formaldehyde are reacted.

The effect of the pH on the reaction of the instant invention may be demonstrated by carrying out the reaction at different pH's in accordance with the following procedure:

A reaction mixture of furfuryl urea and Formalin (i. e., 37 per cent aqueous formaldehyde solution) is adjusted to the desired pH by the addition of triethanolamine and then refluxed. At the end of a definite period of time after the reflux has started, the solution is analyzed to determine the number of mols of formaldehyde that have reacted with each 0.1 mole of furfuryl urea.

Table 2 below shows the results obtained by carrying out the foregoing procedure, and more specifically describes the procedure by which each result is obtained by specifying the amount in mols of furfuryl urea used (line 2), the amount in mols of formaldehyde i. e., contained in a 37 per cent aqueous solution, used (line 3), the pH of the reaction mixture (line 4), and the mols of formaldehyde (HCHO) combined with each 0.1 mol of furfuryl urea after ½ hour of refluxing (line 5), after ¾ hour of refluxing (line 6) and after 1 hour of refluxing (line 7).

Table 2

| 1. Run | 2A | 2B | 2C | 2D | 2E |
|---|---|---|---|---|---|
| 2. Mols of Furfuryl Urea | 0.1 | 0.2 | 0.1 | 0.1 | 0.5 |
| 3. Mols of HCHO | 0.25 | 0.36 | 0.25 | 0.25 | 1.25 |
| 4. pH of reaction mixture | 4.0 | 6.8 | 7.0 | 6.8 | 6.8 |
| MOLS OF HCHO COMBINED WITH EACH 0.1 MOL OF FURFURYL UREA | | | | | |
| 5. After ½ hour | 0.14 | 0.08 | 0.09 | ------ | ------ |
| 6. After ¾ hour | ------ | ------ | ------ | 0.12 | [2] 0.12 |
| 7. After 1 hour | 0.14 | 0.10 | [1] 0.11 | ------ | ------ |

[1] After 1 hour of refluxing the pH was adjusted to 4.0 with lactic acid and refluxing was continued for ½ hour; it was found that 0.185 mol of HCHO had reacted with 0.1 mol of furfuryl urea.

[2] After ¾ hour of refluxing the pH was adjusted to 4.5 with lactic acid and refluxing was continued for ½ hour; it was found that 0.18 mol of HCHO had reacted with each 0.1 mol of furfuryl urea.

The reaction proceeds at ordinary temperatures, but is expedited by heating. An intermediate reaction product may be prepared by carrying the reaction only to its earliest stage, for example, the stage at which the reactants have just formed a common solution, or the reaction or condensation may be carried to any further stage (short of the final infusible resinous stage) at which the product may still be called an intermediate reaction product. Although an intermediate reaction product of the instant invention even in its earliest stages may be precipitated readily by cooling or by diluting the solution with water, for many purposes it is convenient to keep such intermediate reaction product in solution, for example, by the addition of an organic solvent such as methanol to the solution. Such solution, after the addition of any desired ingredients, may be used as a binder in the production of impregnated or laminated products, as an adhesive, as a dressing or crease-proofing agent for textiles, as a paper treating agent, as an ingredient for coating compositions, as a flame proofing agent for wood, and as a composition to be converted into a foam that can be hardened to produce an insulating material.

An intermediate reaction product may be obtained in dry form from a solution by evaporating or diluting it with water to adjust its concentration to the proper value, and then spray-drying or vacuum drum-drying. It is usually more convenient to ship or store an intermediate reaction product in dry form than in the form of a solution. Various ingredients such as fillers, pigments and hardening catalysts, may be mixed with a dry intermediate reaction product so that a coating composition, adhesive, binder or impregnating agent may be obtained simply by adding water or other solvent to the dry mixture.

An acid catalyst may be used in hardening or converting the intermediate reaction product into an infusible resin. Since the action of such a catalyst is due solely to its acidity, any acid substance, such as an inorganic acid (e. g., hydrochloric acid), an organic acid (e. g., oxalic or maleic acids) or an acid salt (e. g., ammonium chloride or sulfate or potassium bisulfate), may be used as the catalyst. The acidity may be furnished by mere addition of an acid substance to the intermediate reaction product, but acidity to catalyze the conversion of the intermediate reaction product to an infusible resin preferably is provided by incorporating a potential acid catalyst (e. g., iso-dibromsuccinic acid) with the intermediate reaction product. A potential acid catalyst is a substance, which, after being added to the intermediate reaction product, remains substantially neutral so long as the reaction product is stored at ordinary temperatures, but decomposes or reacts to generate acidity when the intermediate reaction product is heated in the operation of converting it into an infusible resin. The degree of acidity employed during the hardening of the intermediate reaction product is simply that acidity which causes the intermediate reaction product to harden at the desired rate.

The intermediate reaction product may be used to produce a molding compound which can be molded to produce pieces having good strength and water resistance by carrying out the following procedure:

A reaction mixture of 0.5 mol of furfuryl urea and 1.25 mols of formaldehyde in a 37 per cent aqueous solution is adjusted to a pH of 6.8 by the addition of triethanolamine. After the reaction mixture is refluxed for 45 minutes (at which time 0.12 mol of formaldehyde has reacted with each 0.1 mol of furfuryl urea), the solution is adjusted to a pH of 4.5 with maleic acid and refluxed for 30 minutes more (at which time 0.18 mol of formaldehyde has reacted with each 0.1 mol of furfuryl urea). If at this time the solution is allowed to cool, a resinous layer separates out. The reaction mixture is poured into water and the intermediate reaction product which precipitates is washed two times with water and then dissolved in a solution of 60 grams of methanol, 0.5 gram of maleic acid and 10 grams of water. Alpha cellulose fluff (46 grams) is impregnated with the solution containing the intermediate reaction product by mixing in an egg-beater type mixer. The material so obtained is then dried in air for one and one-half hours at 70° C., and ground in a ball mill with 0.2 gram of zinc stearate as a molding lubricant. The ground material is compression molded to produce articles of dimensions suitable for physical testing. The composition has excellent flowing properties, and gives moldings free from gas.

The water resistance tests employed are standard tests for plastic materials and are considered to be capable of showing generally the water resistance characteristics that are important in industrial materials of this class. Water resistance varies with the amount of moisture that an article is capable of absorbing because the degree of deterioration upon exposure to moisture varies with the amount of water absorbed.

The test piece, referred to hereinafter, for determination of water absorption is a 5.4 gram 2-inch diameter disk molded under a pressure of 17,000 pounds per square inch of projected area in a mold heated with steam at 75 pounds per square inch gauge pressure for different periods of time (i. e., cure times). The disk is immersed in hot or cold water for a given period of time, and the water absorption is measured as the gain in weight (in grams) during the immersion.

Table 3 below shows the results of water resistance tests on articles prepared as above-described, by specifying the period of time (i. e., cure time) which is used to mold the disk (column 1) and the water absorption (in grams) for tests in which the disks are immersed in boiling water for one hour (column 2), and, for the sake of comparison, the water absorption (in grams) obtained under the foregoing conditions for control disks prepared by carrying out the foregoing procedure using a urea-formaldehyde molding compound (column 3).

Table 3

| Column 1, Cure Time (minutes) | Column 2, Water Absorption for Test Disks | Column 3, Water Absorption for Control Disks |
|---|---|---|
| 1 | 0.408 | 0.480 |
| 2 | 0.391 | 0.385 |
| 3 | 0.376 | 0.370 |
| 4 | 0.366 | 0.365 |
| 5 | 0.351 | ---------- |

The molded articles prepared from the ground material hereinbefore described also have excellent strength characteristics. For example, a small bar (0.25'' x 0.036'' x 3''), molded of the ground material for three minutes under a pressure of 5,000 pounds per square inch of projected area in a mold heated with steam at 75 pounds gauge pressure, is rested on supports 1'' apart and a transverse load is applied centrally between the supports. The flexural strength "S" is the extreme fiber stress in pounds per square inch at which the bar fails, calculated according to the formula $$S=\frac{3wl}{2ba^2}$$

in which "w" is the load in pounds, "l" is the length in inches of the bar or span between the supports, "b" is the horizontal dimension in inches or the cross section of the bar and "a" is the vertical dimension in inches of the cross section of the bar. The flexural strength for test pieces embodying the invention is found to be 17,400–18,600 pounds per square inch.

Fillers, plasticizers, hot-plate lubricants, opacifiers, dyestuffs, pigments and other coloring matter may be incorporated with the intermediate reaction product to produce a suitable molding compound. In the preferred method of preparing a molding composition, the filler is impregnated with a solution of a soluble intermediate reaction product, and the solvent is then removed. Fibrous cellulosic material in the form of paper pulp, wood flour or the like preferably is employed as the filler. Alpha cellulose pulp, which is a very pure, white form of cellulose, is the most preferred filler. Heat may be used to faciliate the drying of the impregnated cellulose or other filler. Of course, the drying temperature should not be sufficient to render the molding compound infusible. After the water or alcohol or other solvent has been removed, the dry product may be ground in a ball mill to produce a homogeneous powder, and modifiers, such as plasticizers, lubricants and pigments, may be incorporated in the grinding operation. If desired, the powder may be compressed into blanks or preforms of the proper sizes for use in various molds. The molding compound may be employed in the usual manner for the production of molded articles by compressing it in a closed mold under a pressure of one to four tons per square inch of projected area and at a temperature between 100° C. and 200° C. preferably about 120–150° C., for a period of about two minutes.

The intermediate reaction product may be used to produce an adhesive or laminating composition which can be used in the production of laminated materials having good strength and water resistance by carrying out the following procedure:

A reaction mixture of 0.1 mol of furfuryl urea and 0.25 mol of formaldehyde in a 37 per cent aqueous solution is adjusted to a pH of 7.0 by the addition of triethanolamine. After the reaction mixture is refluxed for 25 minutes (at which time 0.09 mol of formaldehyde is reacted with 0.1 mol of furfuryl urea), the pH of the solution is lowered by adding 0.2 gram of maleic acid and the solution is refluxed for thirty minutes more (at which time 0.185 mol of formaldehyde has reacted with 0.1 mol of furfuryl urea). The reaction mixture is poured into water and the intermediate reaction product which precipitates is removed and then dissolved in a solution of 15 grams of methanol and 0.2 gram of maleic acid. Paper sheets or plies are impregnated with the solution containing the intermediate reaction product and then dried by heating in air at 70° C. for 15 minutes. The dried plies are stacked (i. e., a ten-ply stack) and pressed between platens heated to 220° F. for eight minutes. The water absorption of a small bar (0.2'' x 0.5'' x [illegible] — weighing 1.86 grams) in cold water for 24 hours is 0.16 gram. The flexural strength (obtained as hereinbefore described) of a small bar so prepared is 24,300 pounds per square inch.

An intermediate reaction product may be prepared simply be refluxing for 25 minutes a reaction mixture of 0.1 mol of furfuryl urea and 0.25 mol of formaldehyde in commercial Formalin (i. e., in a 37 per cent aqueous solution having a pH of 4.0). In such a reaction a precipitate forms as the reaction mixture is heated to the boiling point and later on during the reaction the precipitate is redissolved. After refluxing 25 minutes (at which time 0.14 mol of formaldehyde is reacted with 0.1 mol of furfuryl urea), a layer of resin separates out and the addition of 12.8 grams of methanol is necessary to redissolve completely the resin layer. Refluxing the reaction mixture containing the methanol for an additional one-half hour does not appear to cause further reaction of formaldehyde with furfuryl urea. If the intermediate reaction product is precipitated by pouring the reaction mixture into water as hereinbefore described, the product so obtained may be dried by dissolving it in about 30 grams of isopropyl alcohol and then, evaporating the alcohol. If the dried product is obtained by evaporating the isopropyl alcohol by heating the solution in a dish, the viscous residue so obtained can be hardened very rapidly at 140–160° C. by adjusting the pH of the resin to 4.0–5.0 with acids such as maleic acid, oxalic acid and potassium bisulfate. On the other hand, the dry product may be dissolved in 15 grams of beta-methoxy ethanol and 0.2 gram of maleic acid to obtain a composition which may be filmed and baked at 140–160° C. for 15 minutes to yield a clear, hard film which is resistant to organic solvents such as beta-methoxy ethanol and xylene.

Also, an intermediate reaction product of N-substituted compound, formaldehyde and an alcohol may be used to prepare a finish composition which can be used to produce clear, hard films having good water resistance by carrying out the following procedure:

A reaction mixture of 14 grams of furfuryl urea, 7.5 grams of paraformaldehyde, 20 grams of butanol and 0.1 gram of maleic acid is refluxed under a water trap until no more water is given off by the reaction. A clear solution is obtained by adding 5 grams of filter-aid to the reaction mixture and filtering the mixture to obtain a solution free from any insoluble matter. The solution so obtained (30 grams) contains 43 percent solids and has a viscosity of H according to the Gardner-Holdt scale. The solution so obtained is miscible with xylene and may be filmed and baked (e. g., at 140–160° C. for fifteen minutes) to yield a film having good water resistance. A faster curing material may be obtained by adding an acid (e. g., 0.2 gram of maleic acid) to the solution before filming.

If a procedure is carried out which is the same as that described in the foregoing paragraph except that formaldehyde in a 37 per cent aqueous solution (20 grams) is used instead of paraformaldehyde, and the reaction mixture is refluxed for three hours before the maleic acid is added and then refluxed for three hours more after the maleic acid is added, the film so obtained has good water resistance but not so good as the water resistance of the film obtained in the foregoing procedure. If any other alcoholic solvent such as ethyl or propyl alcohol is employed, the product so obtained is also particularly suitable for use in finish compositions.

Articles of infusible resins embodying the invention may be produced by methods other than preparing and hot pressing a molding composition, for example, by casting in open molds and baking. The intermediate reaction products that have been described may be incorporated with a great variety of other resins or potential resins. Also, reaction products of formaldehyde with mixtures of the N-substituted compounds used in the invention with other substances may be produced. The intermediate reaction products in the resulting compositions may be converted into the infusible resins, and a blend or copolymer of different resins may thus be obtained.

Example 1

A thermosetting resin may be prepared by reacting formaldehyde with an N-substituted compound (furfuryl urea) by carrying out the following procedure:

Furfuryl urea is added to a commercial 37 per cent aqueous solution of formaldehyde which contains about 1.5–4 mols of formaldehyde for each mol of furfuryl urea. A sufficient amount of triethanolamine is added to adjust the pH to about 7.0–8.0. After the resulting reaction mixture has been refluxed for about thirty minutes, a sufficient amount of acid (e. g., lactic or maleic acid) is added to reduce the pH to about 4.0–5.0 and the refluxing is continued for thirty minutes more. The reaction mixture is then cooled and mixed with about an equal volume of methanol (to keep the intermediate reaction product in solution) and an acid (e. g., maleic acid) as a catalyst, in an amount equal to about 0.5–1 per cent of the reaction mixture. The solution so formed is then used to impregnate a quantity of alpha cellulose that is about equal in weight to the quantity of furfuryl urea used, and the alpha cellulose is dried by exposure to air at 125° F. for 45 minutes. The dried product is ground to a powder in a ball mill and is molded under pressure of about two tons per square inch of projected area at a temperature of 125° C. for about two minutes. The molded product is hard and infusible.

Example 2

A thermosetting resin may be prepared by reacting formaldehyde with a difurfuryl urea by carrying out the following procedures:

A reaction mixture of 7 grams of symmetrical difurfuryl urea and 8 grams of a 37 per cent aqueous formaldehyde solution is adjusted to a pH of 7.0 by the addition of triethanolamine, and the reaction mixture is refluxed for thirty minutes. If the solution is then allowed to cool, a resinous layer separates out. The solution is evaporated on a hot plate to yield a viscous residue which hardens rapidly at 140–160° C. to an infusible resin upon the addition of maleic or hydrochloric acid in an amount equal to about 3 per cent of the weight of the resin.

A reaction mixture of 0.05 mol of symmetrical difurfuryl urea and 0.15 mol of formaldehyde in a 37 per cent aqueous solution is adjusted to a pH of 7.0 by the addition of triethanolamine. After the reaction mixture is refluxed for thirty minutes (at which time 0.0088 mol of formaldehyde has reacted with each 0.01 mol of difurfuryl urea), the pH of the solution is lowered by the addition of 0.1 gram of maleic acid and the solution is refluxed for 10 minutes more (at which time 0.015 mol of formaldehyde has reacted with each 0.01 mol of difurfuryl urea). The solution is put in a dish and evaporated to yield a resin which is insoluble in water and which is readily converted at 140–160° C. to the infusible state by the addition of an acid (e. g., hydrochloric or phosphoric acid) in an amount equal to about 3 per cent of the weight of the resin.

Substantially the same results may be obtained if unsymmetrical difurfuryl urea is reacted with formaldehyde instead of symmetrical difurfuryl urea, by carrying out procedures which are otherwise the same as the foregoing procedures.

Example 3

A thermosetting resin may be obtained by reaction formaldehyde with furfuryl biuret by carrying out the following procedure:

The reaction mixture of 0.05 mol of furfuryl biuret and 0.15 mol of formaldehyde in a 37 per cent aqueous solution is adjusted to a pH of 7.0 by the addition of triethanolamine. After the reaction mixture is refluxed for thirty minutes (at which time 0.017 mol of formaldehyde has reacted with each 0.01 mol of furfuryl biuret), the solution is poured into a dish and evaporated to yield a viscous resin which hardens to an infusible resin very readily at 140–160° C. upon the addition of an acid (e. g., maleic acid) in an amount equal to about 3 per cent of the weight of the resin.

Various embodiments of the invention may be devised to meet various requirements.

Having described the invention, I claim:

1. A method of producing an intermediate reaction product capable of conversion into an infusible resin that comprises reacting, at a pH from 4 to 8 and at reflux temperature, (1) formaldehyde, (2) a compound having the general formula

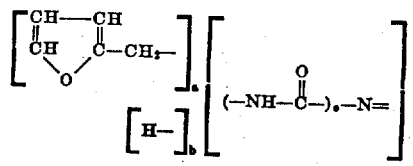

wherein each of the letters a, b and c represents an integer from 1 to 2, and a+b=3 and a+c=from 2 to 3, and (3) a lower monohydric alcohol for uniting with the reaction product of (1) and (2) to impart thereto stability and solubility in organic solvents, the molar ratio of (1) to (2) being from [1/1.5] *1.5/1* to [1/4] *4/1*.

2. A method as claimed in claim 1 in which the compound is furfuryl urea.

3. A cellulose-filled composition comprising an intermediate product of the reaction at a pH from 4 to 8 in aqueous solution at reflux temperature of (1) formaldehyde with (2) a compound having the general formula

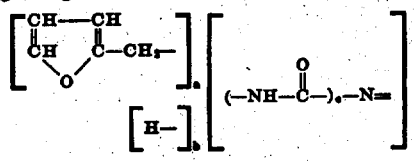

wherein each of the letters a, b and c represents an integer from 1 to 2, and a+b=3 and a+c=from 2 to 3, the molar ratio of (1) to (2) being from 1/1 to 2/1.

4. A cellulose-filled composition comprising an intermediate product of the reaction at a pH from 4 to 8 in aqueous solution at reflux temperature of (1) formaldehyde with (2) furfuryl urea, the molar ratio of (1) to (2) being from 1/1 to 2/1.

5. An intermediate reaction product, formed at a pH from 4 to 8 and at reflux temperature, of (1) formaldehyde (2) a compound having the general formula

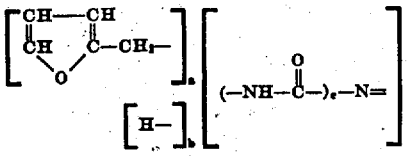

wherein each of the letters a, b and c represents an integer from 1 to 2, and a+b=3 and a+c=from 2 to 3, and (3) a lower monohydric alcohol that is united with the reaction product of (1) and (2) and imparts thereto stability and solubility in organic solvents, the molar ratio of (1) to (2) being from 1/1 to 2/1.

6. A method as claimed in claim 1 in which the compound is unsymmetrical difurfuryl urea.

7. A method as claimed in claim 1 in which the compound is symmetrical difurfuryl urea.

8. A method as claimed in claim 1 in which the compound is furfuryl biuret.

9. A cellulose-filled composition, comprising an intermediate product of the reaction at a pH from 4 to 8 in aqueous solution at reflux temperature of (1) formaldehyde with unsymmetrical (2) difurfuryl urea, the molar ratio of (1) to (2) being from 1/1 to 2/1.

10. A cellulose-filled composition comprising an intermediate product of the reaction at a pH from 4 to 8 in aqueous solution at reflux temperature of (1) formaldehyde with (2) symmetrical difurfuryl urea, the molar ratio of (1) to (2) being from 1/1 to 2/1.

11. A cellulose-filled composition comprising an intermediate product of the reaction at a pH from 4 to 8 in aqueous solution at reflux temperature of (1) formaldehyde with (2) furfuryl biuret, the molar ratio of (1) to (2) being from 1/1 to 2/1.

12. An intermediate reaction product as claimed in claim 5 in which the compound is furfuryl urea.

13. An intermediate reaction product as claimed in claim 5 in which the compound is unsymmetrical difurfuryl urea.

14. An intermediate reaction product as claimed in claim 5 in which the compound is symmetrical difurfuryl urea.

15. An intermediate reaction product as claimed in claim 5 in which the compound is furfuryl biuret.

16. A hot-pressed article comprising a cellulose filler and, as a binder, the infusible reaction product, formed at a pH from 4 to 8 in aqueous solution at reflux temperature of (1) formaldehyde and (2) a compound having the general formula

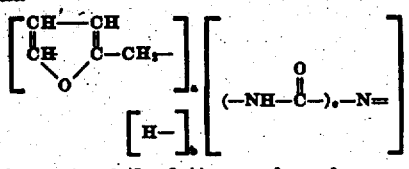

wherein each of the letters a, b and c represents an integer from 1 to 2, and a+b=3 and a+c=from 2 to 3, the molar ratio of (1) to (2) being from 1/1 to 2/1.

17. A molding composition comprising a cellulose filler and, as a binder, the intermediate reaction product, formed at a pH from 4 to 8 in aqueous solution at reflux temperature, of (1) formaldehyde and (2) a compound having the general formula

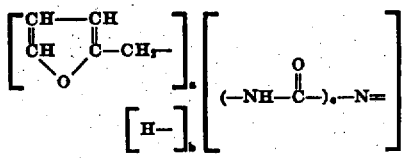

wherein each of the letters a, b and c represents an integer from 1 to 2, and a+b=3 and a+c=from 2 to 3, the molar ratio of (1) to (2) being from 1/1 to 2/1.

18. A molding composition as claimed in claim 17 wherein the compound is furfuryl urea.

19. A molding composition as claimed in claim 17 wherein the compound is unsymmetrical difurfuryl urea.

20. A molding composition as claimed in claim 17 wherein the compound is symmetrical difurfuryl urea.

21. A molding composition as claimed in claim 17 wherein the compound is furfuryl biuret.

22. A coating composition comprising an organic solvent solution of an intermediate reaction product as claimed in claim 5.

JOHN KENSON SIMONS.

REFERENCES CITED

The following references are of record in the file of this patent or the original patent:

UNITED STATES PATENTS

| Number | Name | Date |
|---|---|---|
| 2,427,503 | Morgan | Sept. 16, 1947 |
| 2,427,504 | Morgan | Sept. 16, 1947 |

FOREIGN PATENTS

| Number | Country | Date |
|---|---|---|
| 293,872 | Great Britain | Oct. 3, 1929 |
| 494,700 | Great Britain | Oct. 21, 1938 |

OTHER REFERENCES

Ellis, Chemistry of Synthetic Resins, 1935, page 630.